US009272642B2

(12) United States Patent
Kobayashi et al.

(10) Patent No.: US 9,272,642 B2
(45) Date of Patent: Mar. 1, 2016

(54) VEHICLE SEAT

(71) Applicants: Hideki Kobayashi, Tochigi (JP);
Tetsuya Ishikawa, Saitama (JP);
Kazuhisa Nishimura, Saitama (JP)

(72) Inventors: Hideki Kobayashi, Tochigi (JP);
Tetsuya Ishikawa, Saitama (JP);
Kazuhisa Nishimura, Saitama (JP)

(73) Assignees: TS TECH CO., LTD., Saitama (JP);
HONDA MOTOR CO., LTD, Tokyo (JP)

(*) Notice: Subject to any disclaimer, the term of this patent is extended or adjusted under 35 U.S.C. 154(b) by 0 days.

(21) Appl. No.: 14/477,272

(22) Filed: Sep. 4, 2014

(65) Prior Publication Data

US 2015/0048662 A1  Feb. 19, 2015

Related U.S. Application Data

(63) Continuation of application No. 13/382,091, filed as application No. PCT/JP2010/061156 on Jun. 30, 2010, now Pat. No. 8,845,026.

(30) Foreign Application Priority Data

Jul. 3, 2009 (JP) .................................. 2009-158425
Jul. 3, 2009 (JP) .................................. 2009-158426

(51) Int. Cl.
*B60N 2/30* (2006.01)
*B60N 2/36* (2006.01)
*B60N 2/48* (2006.01)

(52) U.S. Cl.
CPC ............ *B60N 2/3065* (2013.01); *B60N 2/3013* (2013.01); *B60N 2/3088* (2013.01); *B60N 2/36* (2013.01); *B60N 2/487* (2013.01); *B60N 2/4858* (2013.01); *B60N 2205/40* (2013.01)

(58) Field of Classification Search
CPC .... B60N 2/3013; B60N 2/305; B60N 2/3088; B60N 2/36; B60N 2/4858; B60N 2/3065
USPC ................... 297/324, 331, 334, 336, 378.12; 296/65.01, 65.09, 66
See application file for complete search history.

(56) References Cited

U.S. PATENT DOCUMENTS 2,152,505 A   3/1939  Stuart et al.
4,382,629 A   5/1983  Froumajou
(Continued)

FOREIGN PATENT DOCUMENTS

DE   11 2005 001 056    4/2007
JP        2-108624       8/1990
(Continued)

*Primary Examiner* — Peter Brown
(74) *Attorney, Agent, or Firm* — Hamre, Schumann, Mueller & Larson, P.C.

(57) ABSTRACT

In a vehicle seat (car seat 1) including a first seat portion (seat cushion 10) movable between a use position and a retracted position, and a second seat portion (seat back 20) movable between a use position and a retracted position, an actuator mechanism is configured to cause the second seat portion to start moving toward its retracted position at a time when the first seat portion passes a predetermined intermediate position that is on a way from the use position toward the retracted position. In one embodiment, the actuator mechanism includes a biasing member (torsion spring 13, 23) configured to bias each of the seat cushion 10 and the seat back 20 from the use position toward the retracted position, a lock member (lock arm 42) configured to lock the seat back 20 in the use position, and an unlock device (cable 44, 42A) configured to release the lock member to cause the seat back 20 to start moving toward the retracted position, at a time when the seat cushion 10 passes the predetermined intermediate position that is on the way from a posture in which the seat cushion is ready for use toward a posture in which the seat cushion 10 is tipped up.

4 Claims, 8 Drawing Sheets

(56) References Cited

U.S. PATENT DOCUMENTS

| | | |
|---|---|---|
| 4,390,205 A | 6/1983 | Louis |
| 5,641,202 A | 6/1997 | Rus |
| 5,957,522 A | 9/1999 | Matsuhashi et al. |
| 6,817,646 B2 | 11/2004 | Kikuchi et al. |
| 6,860,564 B2 | 3/2005 | Reed et al. |
| 7,059,681 B2 | 6/2006 | Kubo |
| 7,597,375 B2 | 10/2009 | Takatsura et al. |
| 8,496,294 B2 * | 7/2013 | Holdampf et al. ............ 297/316 |
| 2005/0110323 A1 * | 5/2005 | Hofmann et al. .......... 297/378.1 |
| 2005/0248302 A1 | 11/2005 | Garland |
| 2006/0061174 A1 * | 3/2006 | Saberan ....................... 297/331 |
| 2009/0243357 A1 * | 10/2009 | Mori et al. .................... 297/325 |

FOREIGN PATENT DOCUMENTS

| | | |
|---|---|---|
| JP | 10-297332 | 11/1998 |
| JP | 3776200 | 5/2006 |
| JP | 2007-191120 | 8/2007 |

* cited by examiner

VEHICLE SEAT

This application is a Continuation of U.S. Ser. No. 13/382,091, filed Jan. 3, 2012, which is a National Stage Application of PCT/JP2010/061156, filed Jun. 30, 2010, which applications are incorporated herein by reference.

TECHNICAL FIELD

The present invention relates to a vehicle seat such as a car seat, and particularly to a vehicle seat in which a seat layout can be changed with increased swiftness.

BACKGROUND ART

A seat layout changeable configuration for a passenger car's rear seat or other vehicle seat is known in which a seat cushion is frontwardly tipped up and thereafter a seat back is frontwardly tilted down so that a storage space in a rear portion of the vehicle is enlarged. In such a vehicle seat, a configuration provided in order that a seat cushion, a seat back and a head rest can be moved into retracted positions with a simple operation is known in the art (see Patent literature 1), wherein a seat back reclining mechanism is unlocked by a first interlocking mechanism which operates in synchronization with a tip-up motion of the seat cushion, and a head rest is then unlocked by a second interlocking mechanism which operates in synchronization with a frontward tilt-down motion of the seat back to allow the head rest to be tilted down into its retracted position.

On the other hand, Patent literature 2 discloses a car seat configured to have a seat back frontwardly tilted down at the same time when the a seat cushion is raised, wherein a damper is provided in a rotatory motion mechanism of the seat back in order to avoid interference between the seat cushion and the seat back.

CITATION LIST

Patent Literature

Patent literature 1: JP 10-297332 A
Patent literature 2: JP 2007-191120 A

SUMMARY OF INVENTION

Technical Problem

However, in the invention described in Patent literature 1, when the seat cushion and the seat back are moved into the retracted positions, the movement of the seat back starts after the completion of the movement of the seat cushion, and it would thus take undesirably much time to complete the movement of the seat cushion and the seat back.

In the configuration as described in Patent literature 2, change of the seat layout can be completed more quickly in comparison with the car seat of the Patent literature 1, but there is a possibility that the rotatory motion of the seat back would be caused to start even when the seat cushion could not normally be rotated, for example, due to a luggage put on the seat cushion, or for other reason; such an unexpected operation would disadvantageously cause undesired creases or damages on the seat cushion and the seat back.

Against this backdrop, the inventors named herein have created the present invention in the process of research and development for realizing a vehicle seat having two, three or more seat parts wherein the change of a seat layout from a use position in which the seat is ready for use to a retracted position in which the seat not in use is to be located can be performed quickly.

Solution to Problem

A vehicle seat in one aspect of the present invention is a vehicle seat comprising a seat cushion movable between a use position in which the seat cushion is ready for use and a retracted position in which the seat cushion is frontwardly tipped up, and a seat back movable between a use position in which the seat back is ready for use and a retracted position in which the seat back is frontwardly tilted down, wherein the vehicle seat comprises an actuator mechanism configured to cause the seat back to start moving toward its retracted position at a time when the seat cushion passes a predetermined intermediate position that is on a way from a posture in which the seat cushion is ready for use toward a posture in which the seat cushion is tipped up.

For example, specifically, the actuator mechanism may be configured, though not limited to this specific configuration, to comprise a biasing member including a seat back biasing part configured to bias the seat back from the use position toward the retracted position; a lock member including a seat back lock part configured to lock the seat back in the use position; and an unlock device including a seat back unlock part configured to release the seat back lock part applied to the seat back, thereby causing the seat back to start moving toward the retracted position, at the time when the seat cushion passes the predetermined intermediate position that is on the way from the posture in which the seat cushion is ready for use toward the posture in which the seat cushion is tipped up.

With this vehicle seat, when the seat cushion caused to move from the use position to the retracted position travels a predetermined amount and comes to a position partway toward the retracted position, the actuator mechanism is activated (for example, an unlock device operates to release the lock member). Therefore, the seat back is caused to start moving (for example, by the action of the biasing member) without waiting for completion of the motion of the seat cushion, and thus the change of the seat layout is expedited. Moreover, since the seat back is not caused to start moving until the seat cushion travels the predetermined amount, the seat back will not move if any situation that obstructs the movement of the seat cushion, such as something being placed on the seat cushion occurs, so that undesired creases or damages on the seat cushion and the seat back, which would be caused by the motion of the seat back activated while the seat cushion could not be moved, can be prevented from emerging.

In the vehicle seat described above, the seat back unlock part may be configured to unlock the seat back after the seat cushion gets out of a movable region of the seat back or a head rest provided on the seat back.

With this configuration, interference between the seat cushion and the seat back or the head rest provided on the seat back can be prevented without fail, and thus wear and tear of the seat cushion and the seat back can be reduced.

In the vehicle seat described above, the seat back unlock part may be configured to unlock the seat back at a time before the seat cushion gets out of a movable region of the seat back or a head rest provided on the seat back and when the seat back or the head rest does not interfere with the seat cushion.

With this configuration, the change of the seat layout can be completed more expeditiously while avoiding interference between the seat cushion and the seat back or the head rest provided on the seat back.

In the above-described configuration comprising the biasing member, the lock member and the unlock device, in cases where the vehicle seat further comprises a head rest movable between a use position in which the head rest is ready for use and a retracted position in which the head rest is frontwardly tilted down, the biasing member may include a head rest biasing part configured to bias the head rest from the use position toward the retracted position; the lock member may include a head rest lock part configured to lock the head rest in the use position; and the unlock device may include a head rest unlock part configured to release the head rest lock part applied to the head rest, thereby causing the head rest to start moving toward the retracted position.

Herein, the unlock device may be configured such that releasing of the seat back lock part applied to the seat back and releasing of the head rest lock part applied to the head rest occur at the same time when the seat cushion passes the predetermined intermediate position that is on the way from its use position toward its retracted position. This provides a quickly retractable configuration of the seat back and the head rest.

Alternatively, the unlock device may be configured such that releasing of the head rest lock part applied to the head rest occurs at a time when the seat cushion passes a predetermined intermediate position that is on the way from its use position toward its retracted position, and the releasing of the head rest lock part applied to the head rest is timed to come before releasing of the seat back lock part applied to the seat back and to cause a state in which the head rest and the seat back move concurrently to arise. With this configuration, the movement of the head rest occurs antecedently to that of the seat back, and thus the torque required for causing the seat back to get tilted down becomes smaller so that the force to be produced by the biasing member to move the seat back may be smaller. In addition, as the torque required for causing the seat back to get tilted down is smaller, the retracting motion of the seat back can be made more swiftly.

In a vehicle seat further comprising a head rest movable between a use position in which the head rest is ready for use and a retracted position in which the head rest is frontwardly tilted down, in addition to the seat cushion movable between its use position in which the seat cushion is ready for use and its retracted position in which the seat cushion is frontwardly tipped up and the seat back movable between its use position in which the seat back is ready for use and its retracted position in which the seat back is frontwardly tilted down, the actuator mechanism as described above may be configured to comprise: a biasing member including a seat back biasing part configured to bias the seat back from the use position toward the retracted position, and a head rest biasing part configured to bias the head rest from the use position toward the retracted position; a lock member including a seat back lock part configured to lock the seat back in the use position, and a head rest lock part configured to lock the head rest in the use position; and a unlock cable having one end connected to the seat cushion and another end branching off to be connected to the seat back lock part and to the head rest lock part, wherein the unlock cable is configured to release the seat back lock part and the head rest lock part applied to the seat back and the head rest respectively, at a time when the seat cushion passes the predetermined intermediate position that is on the way from its use position toward its retracted position.

With this configuration, the unlock cable releases the seat back lock part and the head rest lock part applied to the seat back and the head rest respectively, at a time when the seat cushion passes the predetermined intermediate position that is on the way from its use position toward its retracted position; therefore, by causing the seat cushion to move, the movements of the seat back and the head rest can be started. Moreover, the unlocking operation is made by means of the cable and thus the movement start timing can be adjusted and changed with ease.

In such a configuration that a cable is used to cause the seat back and the head rest to start moving, the predetermined intermediate position may include a first intermediate position in which the seat cushion is located when the seat back is caused to start moving and a second intermediate position in which the seat cushion is located when the head rest is caused to start moving, wherein the first intermediate position is identical with the second intermediate position.

With this configuration, releasing of the seat back and releasing of the head rest occur at the same time using the unlock cable, and thus they start being retracted at the same time, so that the retracting motions thereof can be made more swiftly.

In such a configuration that a cable is used to cause the seat back and the head rest to start moving, the predetermined intermediate position may include a first intermediate position in which the seat cushion is located when the seat back is caused to start moving and a second intermediate position in which the seat cushion is located when the head rest is caused to start moving, wherein the second intermediate position is closer to the use position of the seat cushion than the first intermediate position.

With this configuration, the movement of the head rest starts antecedently to that of the seat back, and thus the retracting motions thereof can be made more swiftly while interference of the head rest with the seat cushion can be restricted. In this embodiment, the first intermediate position and the second intermediate position may be set such that the seat back is caused to start moving before the head rest reaches its retracted position. With this feature, the head rest and the seat back can be caused to start moving with timing such that there arises a state in which the head rest and the seat back move concurrently. Accordingly, the head rest starts moving before the seat back start moving while the moving times of the seat back and the head rest overlap, whereby the retracting motions thereof can be made swiftly.

A vehicle seat in another aspect of the present invention is a vehicle seat having a first seat portion, a second seat portion and a third seat portion, which are movable between use positions in which the seat is ready for use and retracted positions in which the seat not in use is to be located, the vehicle seat comprising: at least one biasing member configured to bias the second seat portion and the third seat portion toward their respective retracted positions; at least one lock member configured to lock the second seat portion and the third seat portion in their respective use positions; and an unlock device configured to release the at least one lock member to cause the second seat portion and the third seat portion to start moving from the use positions toward the retracted positions at the same time when the first seat portion passes a predetermined intermediate position that is on the way from its use position toward its retracted position.

With this vehicle seat, when the first seat portion passes a predetermined intermediate position that is on the way from its use position toward its retracted position, the unlock device is activated to release the at least one lock member. Accordingly, the second seat portion and the third seat portion start moving from the use positions toward the retracted positions at the same time. Therefore, in comparison with the conventional vehicle seat in which the third seat portion will not start moving until some time lapses after the second seat portion starts moving, the time required until completion of the change of the seat layout can be shortened by the amount of time saved because the third seat portion starts moving simultaneously when the second seat portion starts moving.

Assuming that the first seat portion is a seat cushion, the second seat portion is a seat back, and the third seat portion is a head rest (or an arm rest), the seat back and the head rest starts moving at the same time after the seat cushion passes the predetermined intermediate position that is on the way toward its retracted position, and thus the retracting motions of the seat back and the head rest can be made swiftly. Moreover, when the seat back and the head rest are caused to move at the same time, these seat portions would never interfere with each other; therefore, the structure for enabling the simultaneous movements thereof would not be required to be complicate.

In this embodiment, if it is configured such that the first seat portion located in the predetermined intermediate position is out of a movable region of the second seat portion and the third seat portion, the interference of the first seat portion with the second seat portion and the third seat portion can be avoided without fail.

Alternatively, it may be configured that the first seat portion located in the predetermined intermediate position is within a movable region of the second seat portion or the third seat portion. Even in this configuration, the interference of the first seat portion with the second seat portion and the third seat portion can also be prevented by configuring the unlock device to operate with timing such that the first seat portion will not interfere with the second seat portion or the third seat portion, and the change of the seat layout can be completed more swiftly.

DESCRIPTION OF EMBODIMENTS

First Embodiment

Hereafter, a description will be given of a first embodiment of the present invention with reference to the drawings.

Figure 1:
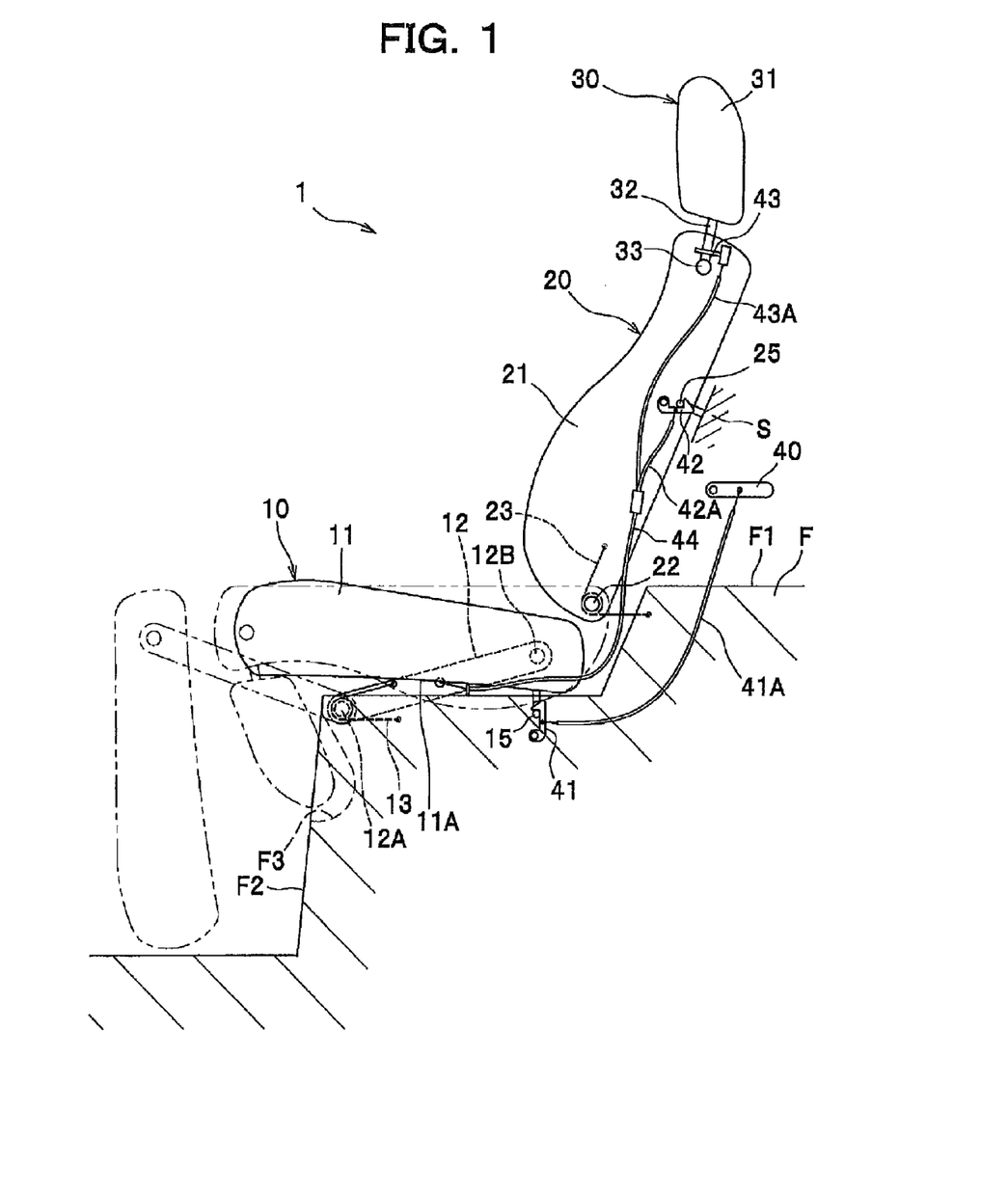
FIG. 1 is a side view of a car seat according to a first embodiment.

As shown in FIG. 1, a car seat 1 as an example of a vehicle seat according to the first embodiment of the present invention includes a seat cushion 10 as one example of a first seat portion, a seat back as one example of a second seat portion, and a head rest 30 as one example of a third seat portion. The car seat 1 is movable between a use position as indicated by solid lines in FIG. 1 in which it is ready for use, i.e., for receiving a person to be seated or a luggage to be placed and a retracted position as indicated by chain double-dashed lines in which the seat not in use is to be located and which is achieved by tipping up the seat cushion 10 frontwardly (in a direction away from the seat back 20, i.e., such a direction as to enlarge the cabin's storage space) and tilting the seat back 20 down into the resultantly created space. The car seat 1 is, for example, a rear seat of a passenger car, and configured such that when it is moved into the retracted position, the floor surface F1 for luggage in the floor F of the car body and a rear surface of the seat back 20 (NB: in this description, the front/rear/left/right/upper/lower directions are designated with reference to the posture of the car seat 1 in the use position) become flush with each other so that the floor surface F1 of the cabin can be substantially enlarged. Particularly, in the car seat 1 according to the present embodiment, as evident from FIG. 5 (b), the rear end of the seat cushion 10 (located at the top in FIG. 5 (b)) is flush with the rear surface of the seat back 20 and the floor surface F1 of the cabin, so that the cabin's space is rendered very large.

As shown in FIG. 1, the seat cushion 10 includes a cushion body 11 incorporating a seat frame (not shown), a support arm 12 supporting the cushion body 11 in such a manner that the cushion body 11 can swing relative to the floor F of the car body, a torsion spring 13, and a lock pin 15.

Figure 5:
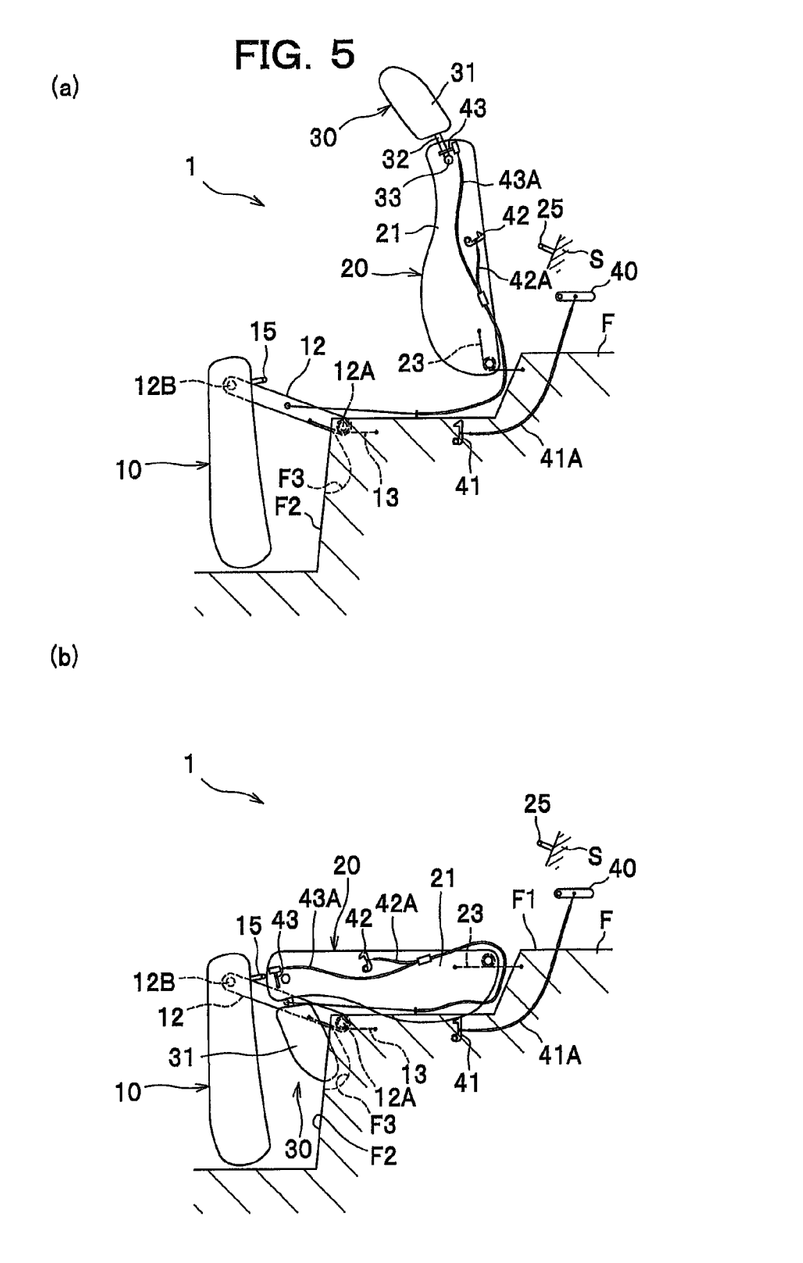
FIG. 5 includes schematic diagrams illustrating the retracting process of the car seat according to the first embodiment, wherein (a) shows a state exhibited some time later after the seat back and the head rest have moved, and (b) shows a state in which the seat back and the head rest have completely been retracted.

In the floor F, at its front wall F2 opposite to the seat cushion 10 in its retracted position, a recessed portion F3 is formed which can receive the head rest 30 in its retracted position without causing the head rest 30 to get in contact with the front wall F2. Since the floor F is configured such that the head rest 30 is received inside the recessed portion F3 formed in the front wall F2, the seat in the retracted position can be stored compactly. Furthermore, the head rest 30 in the retracted position as shown in FIG. 5 (b) is folded to a position so close to the recessed portion F3 formed in the front wall F2 that the head rest 30 is acutely angled with the seat back 20 (i.e., the distal end of the head rest 30 is located rearwardly of the proximal end thereof), and thus the seat in the retracted position can be stored more compactly.

Figure 3:
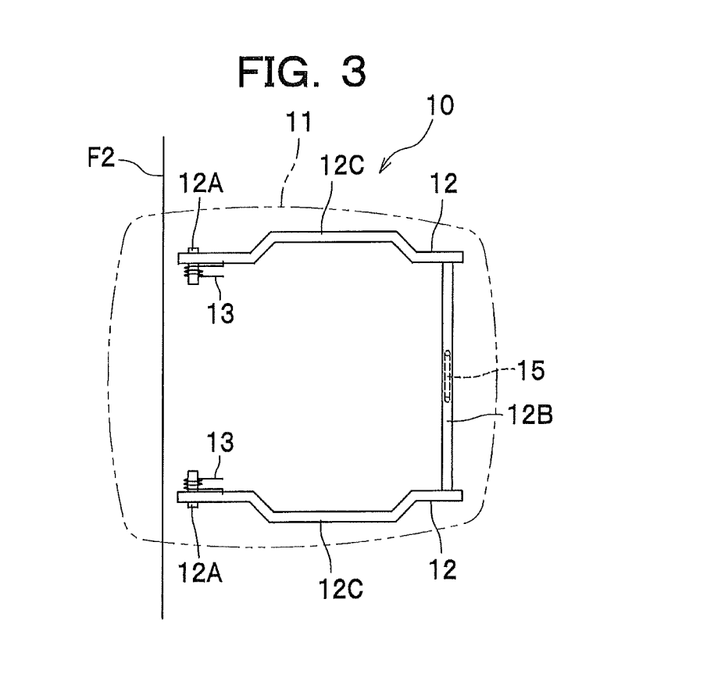
FIG. 3 is a plan view showing a support arm of the seat cushion.

The support arm 12 is, when located in the use position as shown in FIGS. 1 and 3, disposed to extend substantially in a front-rear direction, wherein front end portions thereof are pivotally supported on the floor F at pivot shafts 12A, and rear end portions thereof are pivotally linked to a seat frame (not shown) by a pivot shaft 12B. The pivot shafts 12A at the front end portions are disposed at an upper end portion of the front wall F2 of the floor F. The support arm 12 includes two portions provided at the right and left sides of the cushion body 11, and connected integrally together with the pivot shaft 12B into one piece. Therefore, the support arm 12 is operable to cause the seat cushion 10 to turn without exerting a twisting force on the seat cushion 10.

The support arm 12 is, in plan view as shown in FIG. 3, bent in its portions that are in the middle or vicinity thereof in the front-rear direction to curve laterally to provide outwardly deviated bent portions 12C. These bent portions 12C are disposed to overlap, in a side view, a region through which the upper portion of the seat back 20 and the head rest 30 pass when they are moved from the use position toward the retracted position, which contributes to prevention of interference of the seat back 20 and the head rest 30 with the support arm 12.

Figure 2:
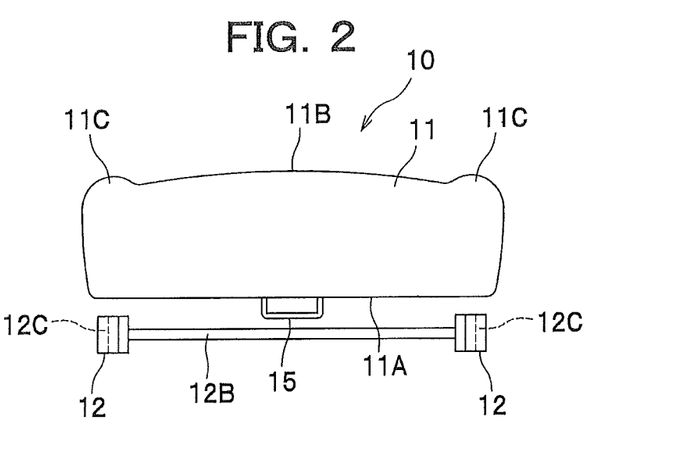
FIG. 2 is a diagram showing a seat cushion as viewed from the rear.

The seat cushion body 11 includes, as shown in FIG. 2, a seating portion 11B located laterally in the middle, and bank-like portions 11C protruding upwardly at the right and left sides of the seating portion 11B to give an occupant the feeling of being supported. The support arm 12 is located directly below the bank-like portions 11C of the seat cushion body 11, and thus creates no discomfort for the occupant being seated. To be more specific, the support arm 12 is not under the seating portion 11B, and thus would not mar the cushiony effect of the seating portion 11B. In particular, in the present embodiment, provision of the bent portions 12C in the support arm 12 makes the support arm 12 detour around the region of the seating portion 11B capable of being weighed down, and can thus ensure that the satisfactory cushiony effect of the seating portion 11B would be maintained.

The torsion spring 13 is provided at each of the right and left independently provided pivot shafts 12A, to continuously bias the support arm 12 frontward, i.e., toward the retracted position of the seat cushion 10. This makes it possible to cause the seat cushion to stably move, and to achieve miniaturization of the torsion spring 13.

The lock pin 15 is a U-shaped member provided at an undersurface 11A of the cushion body 11 and configured to protrude downward therefrom, such that a hook-like lock arm 41 provided at the floor F is engageable therewith in order for the seat cushion 10 to be fixed to the floor F. The lock pin 15 is provided at a single spot located centrally in the lateral direction. Accordingly, the seat cushion 10 would not be twisted by rotating force exerted by the torsion springs 13, so that the stability of the seat cushion 10 can be enhanced.

As shown in FIG. 1, the seat back 20 includes a seat back body 21, and is supported at the floor F in such a manner that the seat back body 21 is rotatable about a pivot shaft 22 provided at a lower portion thereof. A torsion spring 23 is provided at the pivot shaft 22 to continuously bias the seat back 20 frontward, i.e., toward its retracted position.

A lock pin 25 similar to the lock pin 15 is fixed to a sidewall S of the car, and a lock arm 42 as one example of a lock member (seat back lock part) is provided inside the seat back body 21, and configured to be engageable with the lock pin 25 in order for the seat back 20 to be locked in its use position. It is to be understood that the lock arm 42 is continuously biased toward the locking direction by a spring (not shown).

The head rest 30 includes a head rest body 31, and a support pillar 32 for the head rest body 31 to be supported therewith by the seat back 20. The support pillar 32 is supported by a pivot shaft member 33 at the seat back body 21. The pivot shaft member 33 incorporates a spring (not shown) to continuously bias the head rest 30 frontward, i.e., toward its retracted position.

A lock arm 43 as one example of a lock member (head rest lock part) is provided inside the seat back body 21, and the lock arm 43 is configured to be engageable with the support pillar 32 to lock the head rest 30 in the use position. It is to be understood that the lock arm 43 is continuously biased toward the locking direction by a spring (not shown).

Among the aforementioned members, the torsion spring 23 and the spring incorporated in the pivot shaft member 33 are exemplary of parts of a biasing member (i.e., a seat back biasing part and a head rest biasing part).

The aforementioned seat portions are configured to be moved through manipulation of a control lever 40, which is provided at an appropriate position of the car, into the retracted positions. To be more specific, the lock arm 41 is connected via a cable 41A to the control lever 40, in such a manner that when the cable 41A is pulled by manipulation of the control lever 40, the lock arm 41 is caused to turn. The lock arm 42 is connected to a cable 42A, and the lock arm 43 is connected to a cable 43A, whereas the cable 42A and the cable 43B are connected to one cable 44, and an end of the cable 44 is connected to the support arm 12. With this configuration, when the support arm 12 is swung frontwardly during a motion of the seat cushion 10 caused to turn to the front, the cables 44, 42A, 43A are pulled to thereby cause the lock arms 42, 43 to be released at the same time. That is, the cables 44, 42A, 43A are one exemplified arrangement of the unlock device and the unlock cable (including the seat back unlock part and the head rest unlock part).

Timing of release of the lock arms 42, 43 can be adjusted by changing the position in the support arm 12 to which the end of the cable 44 is connected, the position of the cable 44 in the retracted position to the unlocking position (corresponding to the amount of play or the amount of slack), and the like. In the present embodiment, releasing of the lock arms 42, 43 applied to the seat back 20 and the head rest 30, respectively, is timed to come after the seat cushion 10 goes out of a movable region (the outermost border is indicated by line L1 in FIG. 4 (b)) through which the seat back 20 and the head rest 30 passes when moved from their use positions toward the retracted positions, and before the seat cushion 10 reaches its retracted position.

Operation of the car seat 1 configured as described above will now be described.

Starting from a usable state as shown in FIG. 1, the control lever 40 is manipulated, and the cable 41A is then pulled to cause the lock arm 41 to turn, so that engagement of the lock arm 41 with the lock pin 15 is released. Once the seat cushion 10 is thus released, the biasing force of the torsion spring 13 causes the seat cushion 10 to turn frontward as shown in FIG. 4 (a).

When the seat cushion 10 makes a predetermined amount of its turn, the cable 44 of which one end is connected to the support arm 12 is pulled by the support arm 12. This motion of the cable 44 being pulled is transmitted to the cables 42A, 43A and causes the lock arms 42, 43 to turn, so that engagement of the lock arm 42 with the lock pin 25 and engagement of the lock arm 43 with the support pillar 32 are released. In other words, the locks which have fixed the seat back 20 and the head rest 30 in their use positions are released at the same time.

Figure 4:
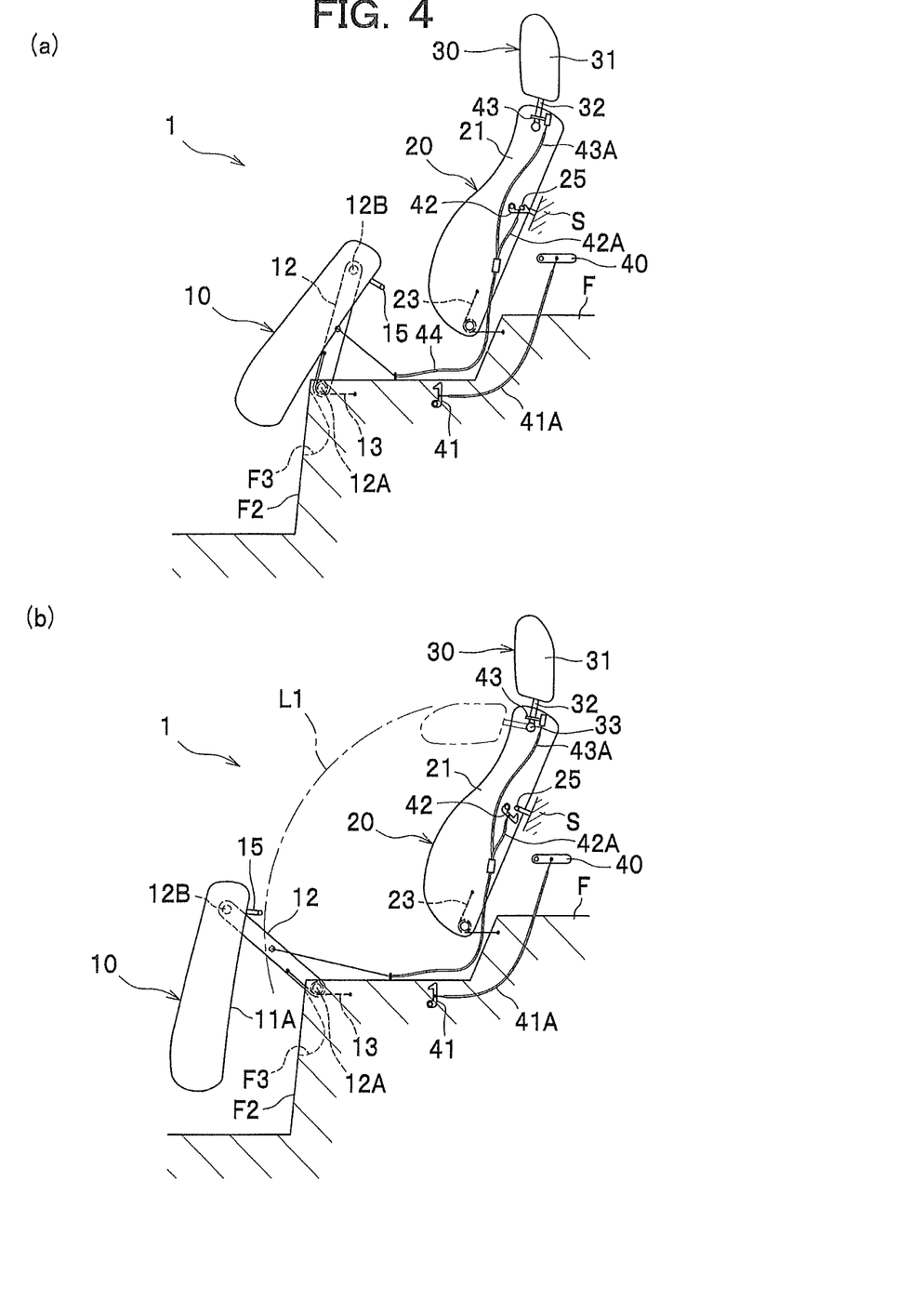
FIG. 4 includes schematic diagrams illustrating a retracting process of the car seat according to the first embodiment, wherein (a) shows a state in which only the seat cushion is moving, and (b) shows a state of the car seat at a time when the seat cushion has come out of a movable region of a seat back and a head rest.

In the present embodiment, releasing of the locks is timed to come after the undersurface 11A of the seat cushion 10 moves to an outside beyond the line L1 defining the movable region of the seat back 20 with the head rest 30 being folded down, and before completion of the motion of the seat cushion 10 toward its retracted position, as shown in FIG. 4 (*b*).

When the seat back 20 and the head rest 30 are released at the same time, the biasing force of the torsion spring 23 and the biasing force of the spring incorporated in the pivot shaft member 33 cause the seat back 20 and the head rest 30 to start turning frontward at the same time as shown in FIG. 5 (*a*). The seat cushion 10 comes into its retracted position which is spaced a predetermined distance apart frontward from the floor F that was under the car seat 1 in its use position.

The seat back 20 and the head rest 30 are further turned until the seat cushion 10, the seat back 20 and the head rest 30 are all moved into their retracted positions, as shown in FIG. 5 (*b*). At this time, the head rest 30 is in a frontwardly folded state and stored in a gap between the seat cushion 10 in its retracted position and the front wall F2 of the floor F. The head rest 30 is stored partially inside a recessed portion F3 formed in the floor F. Moreover, spacings between the head rest 30 in its retracted position and the recessed portion F3 of the front wall F2 are designed such that the distance from the distal end portion of the head rest 30 (located at its bottom in the retracted position shown in FIG. 5 (*b*)) is greater than the distance from the proximal end portion of the head rest 30 (located at its top in the retracted position shown in FIG. 5 (*b*)); therefore, even when the motion of the head rest 30 being turned into the retracted position causes the distal end thereof to rush rearward, a contact of the distal end of the head rest 30 with the front wall F2 which would occur by the inertia of the head rest 30 is suppressed.

As described above, with the car seat 1 according to the present embodiment, when the seat cushion 10 is caused to make a predetermined amount of motion from the use position, the lock arms 42, 43 are activated by the cables 44, 42A, 43A, and the seat back 20 and the head rest 30 start moving toward their retracted positions at the same time. Therefore, in comparison with the conventional configuration in which the head rest will not start moving until some time lapses after the seat back starts moving, the change of the seat layout can be completed quickly. Moreover, when the seat back 20 and the head rest 30 are caused to move at the same time, these members would never interfere with each other; therefore, the structure for enabling the simultaneous movements thereof would not get complicate. Furthermore, since the head rest 30 and the seat back 20 are caused to start their turning motions and thus the retraction of the head rest 30 is completed at a relatively earlier stage, the force (biasing force of spring, etc.) for causing the seat back 20 to turn can be reduced.

With the car seat 1 according to the present embodiment, the seat back 20 and the head rest 30 start moving toward their retracted positions after the seat cushion 10 has moved a predetermined amount from its use position and before the seat cushion has finished moving to the retracted position; therefore, in this respect as well, the change of the seat layout can be completed more swiftly than the conventional configuration.

Moreover, with the car seat according to the present embodiment, the seat back 20 and the head rest 30 start moving toward the retracted positions after the seat cushion 10 moves to the outside of the movable region of the seat back 20 and the head rest 30; therefore, the seat back 20 and the head rest 30 would never collide with the underside 11A of the seat cushion 10, so that creases or damages on the seat can be prevented from occurring.

The car seat 1 is also configured such that the motion of the seat cushion 10 and the motion of the seat back 20 do not start at the same time but the seat back 20 moves after the seat cushion 10 travels a predetermined amount. Therefore, if the seat cushion 10 fails to start its motion, for example, because of an object placed on the seat cushion 10, the seat back 20 will not start its motion, and thus undesired creases or damages on the seat cushion 10 and the seat back 20 can be prevented from occurring.

Furthermore, the recessed portion F3 provided in the front wall F2 of the floor F to allow at least part of the head rest 30 to be accommodated can serve to prevent the head rest 30 from getting soiled due to contact with the front wall F2. Since this recessed portion F3 is provided below a position of the floor F to which the support arm 12 is attached (i.e., below the pivot shaft 12A), a compactly retractable configuration of the seat is realized by effectively utilizing the space in the floor F below the seat cushion 10. Particularly, in the present embodiment, the recessed portion F3 has a bottom rearwardly recessed deeper beyond the position immediately below the pivot shaft 12A, and thus the contribution to the compactly retractable configuration of the seat is great.

In the car seat 1 according to the present embodiment, since the support arm 12 is provided with the bent portions 12C, interference of the support arm 12 with the seat back 20 and the head rest 30 can be prevented so that damage on the seat back 20 and the head rest 30 can be prevented, and space under the seating portion 11B of the seat cushion 10 can be left unoccupied so that its cushiony effect can be retained. Furthermore, the bent portions 12C of the support arm 12 are located to overlap, in a side view, a region through which the head rest 30 travels, and thus even in cases where the head rest 30 is designed to have a larger size, interference between the support arm 12 and the head rest 30 can be prevented.

Second Embodiment

Next, a second embodiment of the present invention will be described. In describing the present embodiment, only matters different from those of the first embodiment will be focused on, and the same elements as in the first embodiments will be designated by the same reference characters and its description will be omitted.

Figure 6:
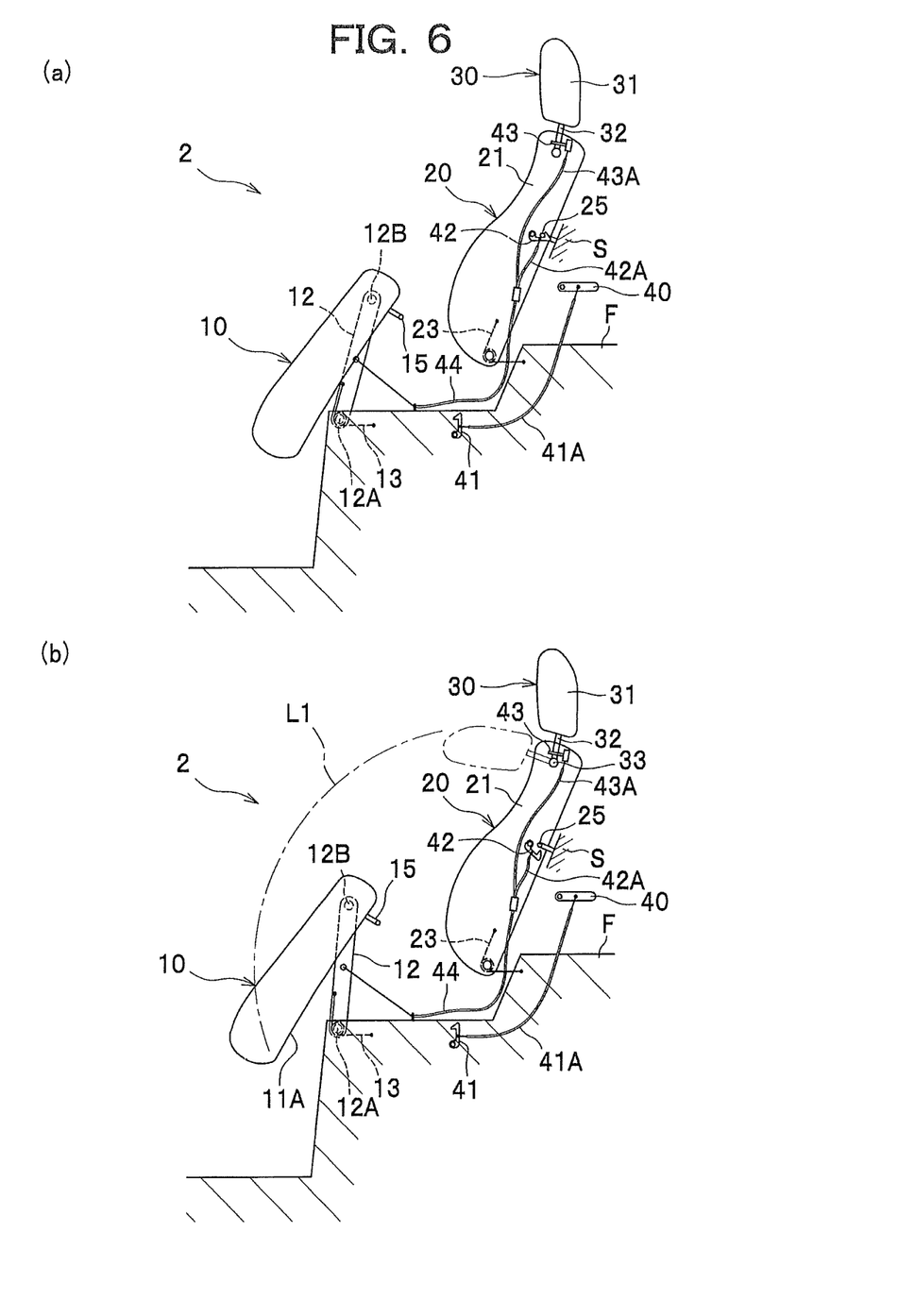
FIG. 6 includes schematic diagrams illustrating a retracting process of a car seat according to a second embodiment, wherein (a) shows a state in which only the seat cushion is moving, and (b) shows a state of the car seat at a time when a seat back and a head rest has been unlocked.

As shown in FIG. 6 (*a*), a car seat 2 according to the second embodiment is configured to move up the timing with which the seat back 20 and the head rest 30 start moving, in comparison with that of the car seat 1 according to the first embodiment. For this reason, settings, such as the position in the support arm 12 to which the end of the cable 44 is connected and the position of the cable 44 in the retracted position to the unlocking position, are adjusted differently. To be more specific, releasing of the locks of the lock arms 42, 43 is timed to come before the seat cushion 10 goes out of the movable region (see line L1 in FIG. 6 (*b*)) of the seat back 20 and the head rest 30 with the proviso that the seat back 20 does not interfere with the seat cushion 10.

With the car seat 2 configured as described above, starting from a state ready for seating like that which is shown in FIG. 1, the control lever 40 is manipulated, and the cable 41A is then pulled to cause the lock ante 41 to turn, so that engagement of the lock arm 41 with the lock pin 15 is released. Once the seat cushion 10 is thus released, the biasing force of the torsion spring 13 causes the seat cushion 10 to turn frontward as shown in FIG. 6 (*a*).

When the seat cushion 10 makes a predetermined amount of its turn, the cables 44, 42A, 43A are pulled by the support arm 12 with timing such that motions of the lock arm 42 and the lock arm 43 occur before the undersurface 11A of the seat cushion 10 moves to the outside beyond the line L1 defining the movable region of the seat back and the head rest 30 and the subsequent motions of the seat back 20 and the head rest 30 travelling frontward do not cause interference of them with the undersurface 11A of the seat cushion 10, as shown in FIG. 6 (b). As a result, the engagement of the lock arm 42 with the lock pin 25, and the engagement of the lock arm 43 with the support pillar 32 are released. In other words, the locks which have fixed the seat back 20 and the head rest in their use positions are released.

Figure 7:
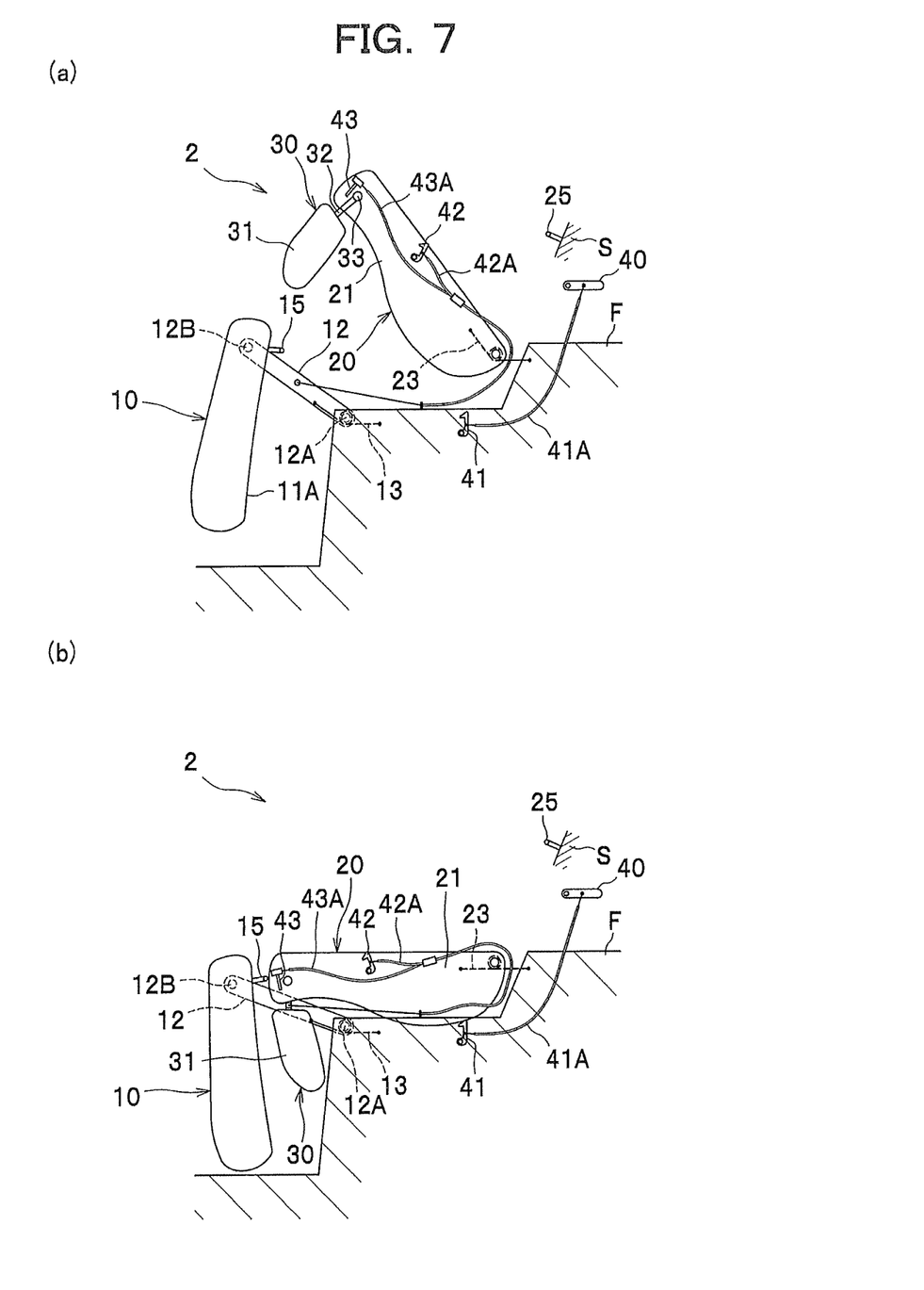
FIG. 7 includes schematic diagrams illustrating the retracting process of the car seat according to the second embodiment, wherein (a) shows a state exhibited some time later after the seat back and the head rest have moved, and (b) shows a state in which the seat back and the head rest have completely been retracted.

When seat back 20 and the head rest 30 are released, the biasing force of the torsion spring 23 and the biasing force of the spring incorporated in the pivot shaft member 33 cause the seat back 20 and the head rest 30 to start turning frontward at the same time as shown in FIG. 7 (a), and when the seat back 20 and the head rest 30 comes near the seat cushion 10, the seat cushion 10 further turns frontward from the state shown in FIG. 6 (b) with the result that the seat back 20 and the head rest 30 do not come in contact with the undersurface 11A of the seat cushion 10.

Then, the seat cushion 10, the seat back 20 and the head rest 30 further moves, until all of the seat cushion 10, seat back 20 and the head rest 30 come to their retracted positions as shown in FIG. 7 (b).

In this way, with the car seat 2 according to the second embodiment, the movement of the seat back 20 and the seat cushion 30 starts at a time before the seat cushion 10 moves out of the movable region of the seat back 20 and the head rest 30, and thus the change of the seat layout can be completed more swiftly. Although this embodiment is configured such that even in a state that the seat cushion 10 and the head rest 30 approach nearest each other, a slight gap remains therebetween, a further consideration is given to the temperature change and secular change of the cable 41A for releasing the seat cushion 10, the cable 42A for releasing the seat back 20, and the cable 43A for releasing the head rest 30, so that extra gaps corresponding to the amount of changes thereof mentioned above are added to thereby achieve increased stability of the motion of the seat being retracted.

Although two embodiments of the present invention have been described above, the present invention may be carried out into practice in appropriately modified configurations, as in the other embodiments described below.

For example, in the above-described embodiments, only one particular configuration is described by way of example in which the seat back 20 and the head rest 30 are released at the same time and thus caused to start moving at the same time. To be more specific, in the above-described embodiments, a first intermediate position and a second intermediate position coincide with each other where the first intermediate position refers to the position in which the seat cushion 10 is located at a time when the seat back 20 starts moving, and the second intermediate position refers to the position in which the seat cushion 10 is located at a time when the head rest 30 starts moving. However, the present invention is not limited to this specific configuration, but another configuration may also be an option in which the head rest 30 is released before the seat back 20 so that the motion toward the retracted position of the head rest 30 starts prior to that of the seat back 20. That is, the second intermediate position of the seat cushion 10 may be in a position shifted to its use position side relative to the first intermediate position thereof.

Figure 8:
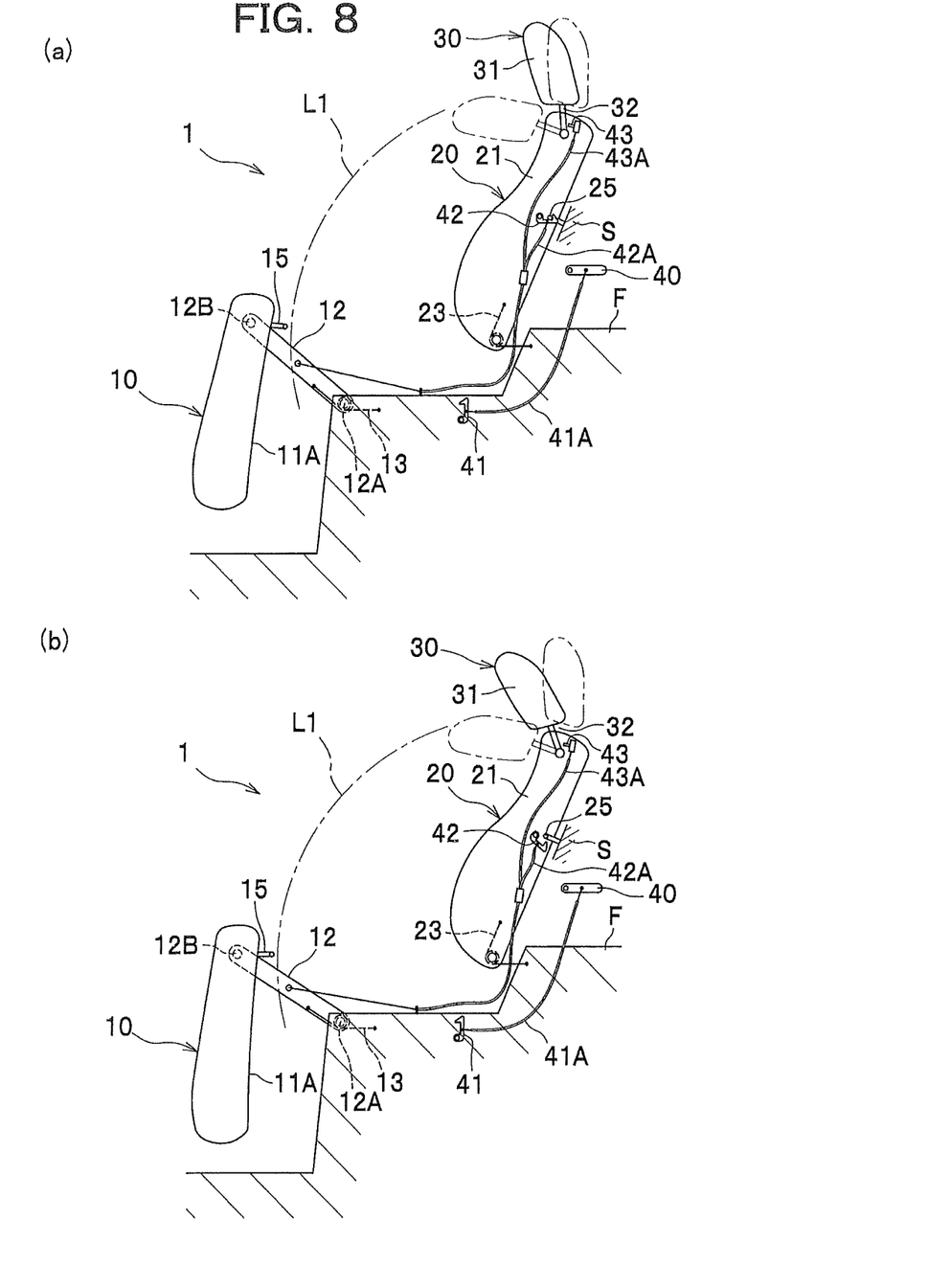
FIG. 8 includes schematic diagrams illustrating a retracting process of a car seat according to a modified embodiment, wherein (a) shows a state in which a head rest starts moving, and (b) shows a state in which the seat back has been unlocked.
Figure 9:
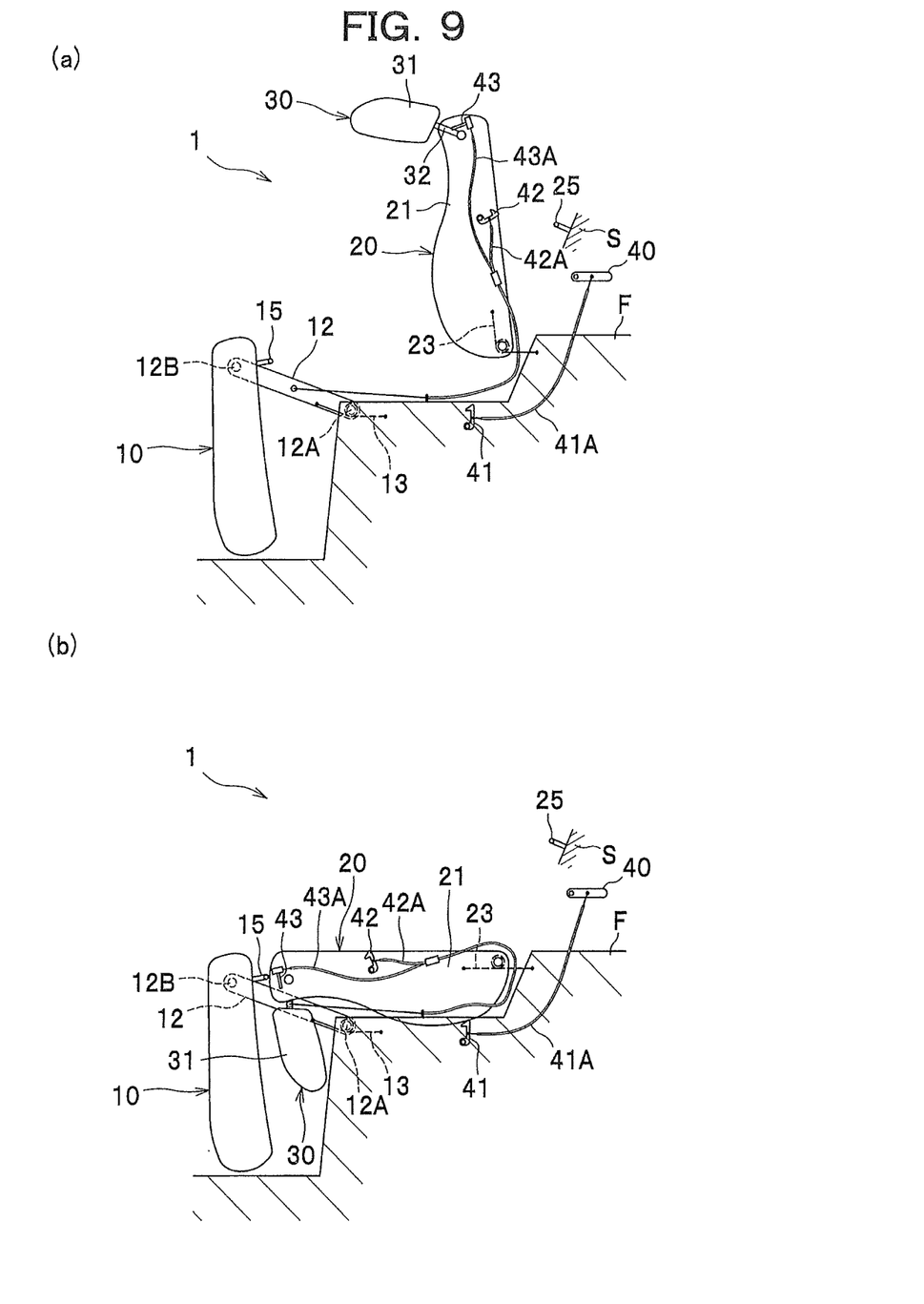
FIG. 9 includes schematic diagrams illustrating the retracting process of the car seat according to the modified embodiment, wherein (a) shows a state in which the head rest and the seat back are moving at the same time, and (b) shows a state in which the seat back and the head rest have completely been retracted.

Referring now to the drawings, the lock arm 43 is activated, as shown in FIG. 8 (a), at a time when the seat cushion 10 makes a predetermined amount of turn toward its retracted position (i.e., at a time when the seat cushion 10 is in the second intermediate position), to thereby cause the head rest 30 to start moving to its retracted position. The lock arm 42 is then activated, as shown in FIG. 8 (b), in a little while behind the start of the motion of the head rest 30 (i.e., at a time when the seat cushion 10 is in the first intermediate position, that is, the position short of, or shifted toward its use position relative to, the second intermediate position), to thereby release the seat back 20. Subsequently, the head rest 30 and the seat back 20 are both caused to turn frontwardly; as shown in FIG. 9 (a), and the movements of all these members, i.e., the seat cushion 10, the seat back 20 and the head rest 30, to the retracted positions are completed, as shown in FIG. 9 (b). It is to be understood that the timings of the activations of the lock arm 43 and the lock arm 42, shifted as above, may be set easily by adjusting the unlock positions of the cable 43A and the cable 42A.

According to this configuration, in which the head rest 30 starts turning frontward before the seat back 20, the distance from the center of the turning motion of the seat back 20 to the outer edge of the head rest 30 can be shortened, and thus the torque required when the seat back 20 is caused to tilt down can be made smaller so that the power of the torsion spring 23 can be made smaller. Moreover, by making the torque required to cause the seat back 20 to tilt down smaller, the turning motion of the seat back 20 can be made quicker.

The timings of the motions of the head rest 30 and the seat back 20 may be set without limitation to the above-described embodiments, and releasing of the head rest 30 and the seat back 20 may thus be timed to cause a state in which the head rest 30 and the seat back 20 move concurrently to arise. With this configuration, the time of motions of the seat back 20 and the head rest 30 overlap, and thus they can be retracted quickly.

In the above-described embodiments, an example of the first seat portion is illustrated by the seat cushion 10, an example of the second seat portion is illustrated by the seat back 20, and an example of the third seat portion is illustrated by the head rest 30, but the seat portions are not limited to the illustrated examples, and any other portions (e.g., an arm rest) of the seat may be configured accordingly. The mode of the change of the seat layout is also not limited to the illustrated examples, and the motion of each seat portion may be designed in any other mode.

In the above-described embodiments, members for locking the seat back 20 and the head rest 30 are configured as the independently provided lock arms 42, 43, but these members may be made of a single member if feasible in view of the limitations on the layout. For example, an engageable part for locking the head rest 30, such as the support pillar 32, and an engageable part for locking the seat back 20 may be arranged adjacent to each other, and a single lock arm may be provided which is configured to be simultaneously engageable with these two engageable parts.

In the above-described embodiments, members for biasing the seat cushion 10, the seat back 20 and the head rest 30 are configured as the independently provided members, but some or all of these members may be made of a single spring if feasible in view of the limitations on the layout.

In the above-described embodiments, an actuator mechanism configured to cause the seat back 20 and the head rest 30 to move from the use positions toward the retracted positions is configured such that the seat back 20 and the head rest 30 locked by the lock members (lock arms 42, 43) are continuously biased by biasing members such as springs, and released with predetermined timings, but the present invention is not limited to this specific configuration. For example, the seat back 20 and the head rest 30 may be configured to be driven by a motor.

In the above-described embodiments, the times at which the lock arms 42, 43 are to be released are determined by configuring the cables 44, 42A, 43A, but a sensor may be used instead to detect the posture of the seat cushion 10 so that the start of the turning motions of the seat back 20 and the head rest 30 is timed according to the posture of the seat cushion 10 under the analog or digital control.

In the above-described embodiments, a car seat 1 is illustrated as an example of a vehicle seat, but the vehicle seat according to the present invention is applicable to any other vehicle seat, for example, a seat for a ship or for an aircraft.

The invention claimed is:

1. A vehicle seat, comprising:
 a seat cushion movable between a seat cushion use position in which the seat cushion is ready for use and a seat cushion retracted position in which the seat cushion is frontwardly tipped up;
 a seat back movable between a seat back use position in which the seat back is ready for use and a seat back retracted position in which the seat back is frontwardly tilted down;
 a head rest movable between a head rest use position in which the head rest is ready for use and a head rest retracted position in which the head rest is frontwardly tilted down; and
 an actuator mechanism comprising:
  a biasing member including a seat back biasing part and a head rest biasing part, the seat back biasing part being configured to bias the seat back from the seat back use position toward the seat back retracted position, and the head rest biasing part being configured to bias the head rest from the head rest use position toward the head rest retracted position,
  a lock member including a seat back lock part and a head rest lock part, the seat back lock part being configured to lock the seat back in the seat back use position, and the head rest lock part being configured to lock the head rest in the head rest use position, and
  an unlock device connected to the seat cushion, the unlock device including a seat back unlock part and a head rest unlock part,
  the seat back unlock part being configured to release the seat back lock part applied to the seat back, thereby causing the seat back to start moving toward the seat back retracted position due to the seat back biasing part, at a time when the seat cushion passes a predetermined intermediate position that is on a way from a posture in which the seat cushion is ready for use toward a posture in which the seat cushion is tipped up, and
  the head rest unlock part being configured to release the head rest lock part applied to the head rest, thereby causing the head rest to start moving toward the head rest retracted position due to the head rest biasing part,
  wherein the unlock device is operable by a movement of the seat cushion so that the unlock device releases both of the seat back lock part applied to the seat back and the head rest lock part applied to the head rest at the same time when the seat cushion passes the predetermined intermediate position that is on the way from the seat cushion use position toward the seat cushion retracted position.

2. The vehicle seat according to claim 1, wherein the seat back unlock part is configured to unlock the seat back after the seat cushion gets out of a movable region of the seat back or a head rest provided on the seat back.

3. The vehicle seat according to claim 1, wherein the seat back unlock part is configured to unlock the seat back at a time before the seat cushion gets out of a movable region of the seat back or a head rest provided on the seat back and when the seat back or the head rest does not interfere with the seat cushion.

4. The vehicle seat according to claim 1, wherein the unlock device of the actuator mechanism comprises an unlock cable having one end connected to the seat cushion and another end branching off to be connected to the seat back lock part and to the head rest lock part, and the unlock cable being configured to release the seat back lock part and the head rest lock part applied to the seat back and the head rest respectively, at a time when the seat cushion passes the predetermined intermediate position that is on the way from the seat cushion use position toward the seat cushion retracted position.

* * * * *